US011036763B2

(12) United States Patent
Franke et al.

(10) Patent No.: US 11,036,763 B2
(45) Date of Patent: Jun. 15, 2021

(54) FLEXIBLE ORGANIZATIONAL HIERARCHY

(71) Applicant: SAP SE, Walldorf (DE)

(72) Inventors: Jörg Franke, Bruchsal (DE); Manfred Crumbach, Wiesloch (DE); Hao Zhou, Shanghai (CN); Hao Liu, Shanghai (CN); Weicheng Mao, Shanghai (CN); Nan Luo, Shanghai (CN); Jie Cen, Shanghai (CN)

(73) Assignee: SAP SE, Walldorf (DE)

( * ) Notice: Subject to any disclaimer, the term of this patent is extended or adjusted under 35 U.S.C. 154(b) by 570 days.

(21) Appl. No.: 15/794,864

(22) Filed: Oct. 26, 2017

(65) Prior Publication Data

US 2019/0130012 A1 May 2, 2019

(51) Int. Cl.

*G06Q 40/06* (2012.01)
*G06F 16/28* (2019.01)
*G06Q 10/06* (2012.01)
*G06F 3/0482* (2013.01)
*G06F 16/2453* (2019.01)
*G06Q 10/10* (2012.01)

(52) U.S. Cl.

CPC .......... *G06F 16/282* (2019.01); *G06F 3/0482* (2013.01); *G06F 16/2453* (2019.01); *G06Q 10/06* (2013.01); *G06Q 10/10* (2013.01); *G06Q 40/06* (2013.01)

(58) Field of Classification Search

CPC .. G06F 16/282; G06F 16/2453; G06F 3/0482; G06Q 10/06; G06Q 40/06; G06Q 10/10

USPC .......................................................... 705/30

See application file for complete search history.

(56) References Cited

U.S. PATENT DOCUMENTS 7,620,647 B2 11/2009 Stephens et al.
7,657,471 B1 2/2010 Sankaran et al.
8,577,841 B2 11/2013 Ouyang et al.
2004/0024662 A1* 2/2004 Gray .................. G06Q 10/0875 705/29
2009/0319403 A1 12/2009 Schlueter et al.
2010/0082521 A1* 4/2010 Meric .................... G06Q 10/00 706/53
2013/0002723 A1 1/2013 Poston et al.
2014/0058906 A1 2/2014 Kahn et al.

* cited by examiner

*Primary Examiner* — Russell S Glass

(74) *Attorney, Agent, or Firm* — Klarquist Sparkman, LLP

(57) ABSTRACT

In one general aspect, a method and system are described for providing a flexible data hierarchy. The method may include obtaining a plurality of data sets, the plurality of data sets including system-defined attributes and user-defined attributes, generating, for each attribute in each data set, a field for receiving input, providing, in a user interface display, at least one data set of the plurality of data sets and the generated field for each attribute in the at least one data set, receiving, in two or more of the generated fields, a value indicating a sequence placement for a respective attribute associated with a respective field of the two or more generated fields, and automatically generating, for the attributes associated with the two or more fields having a value, at least one hierarchical structure according to the sequence placement.

20 Claims, 12 Drawing Sheets

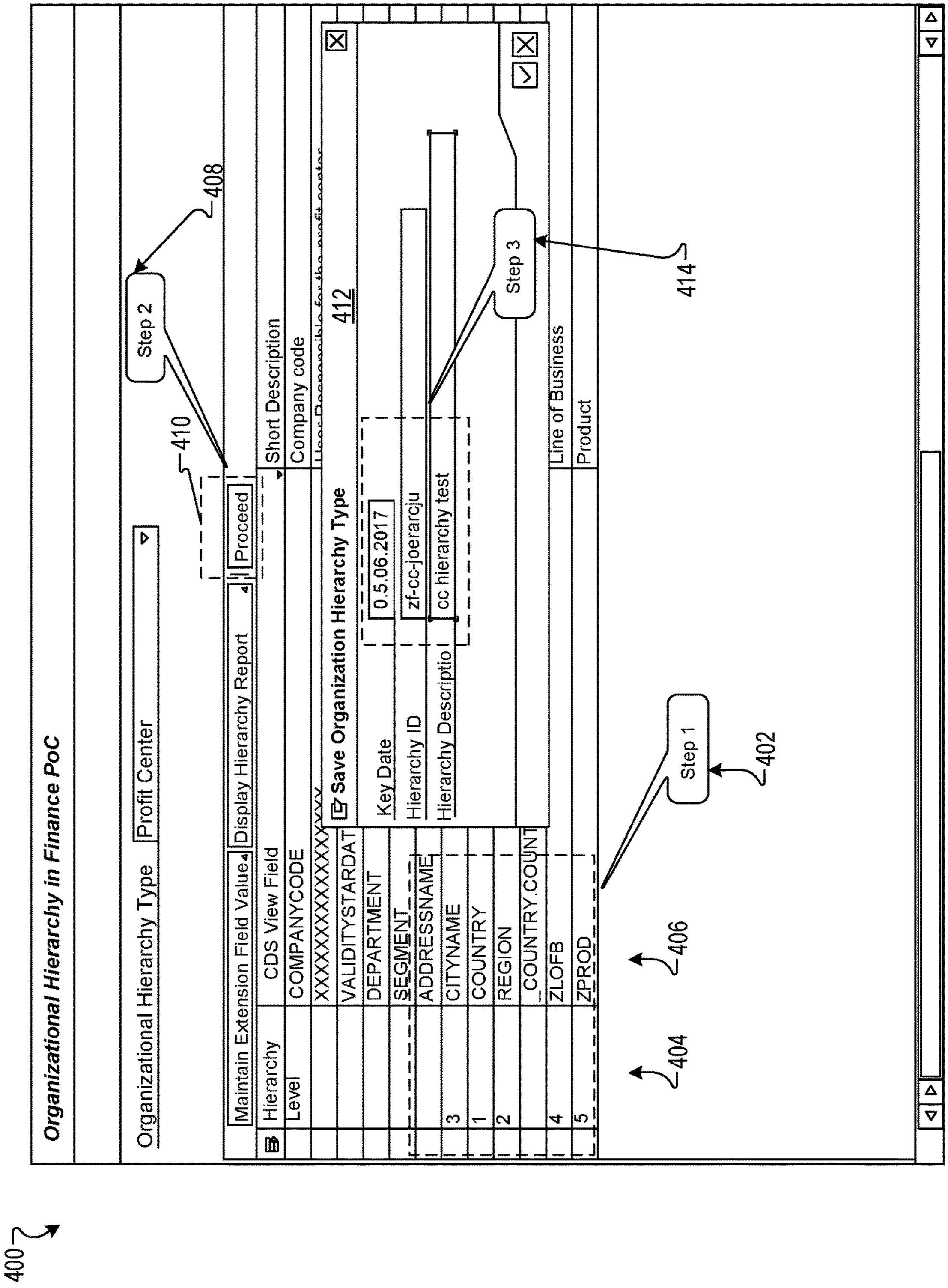

FIG. 4

Organizational Hierarchy in Finance PoC

Organizational Hierarchy Type: Profit Center

| Maintain Extension Field Value | Display Hierarchy Report | Proceed |

| Hierarchy | CDS View Field | |
|---|---|---|
| Level | COMPANYCODE | |
| | XXXXXXXXXXXXXXXX | |
| | VALIDITYSTARDAT | |
| | DEPARTMENT | |
| | SEGMENT | |
| | ADDRESSNAME | |
| 3 | CITYNAME | |
| 1 | COUNTRY | |
| 2 | REGION | |
| | COUNTRY.COUNT | |
| 4 | ZLOFB | |
| 5 | ZPROD | |

— 408 — Step 2
— 410
— 412
— 414 — Step 3
— 402 — Step 1
— 404
— 406

Save Organization Hierarchy Type

| Key Date | 0.5.06.2017 |
| Hierarchy ID | zf-cc-joerarcju |
| Hierarchy Description | cc hierarchy test |

Short Description: Company code

Line of Business
Product

400

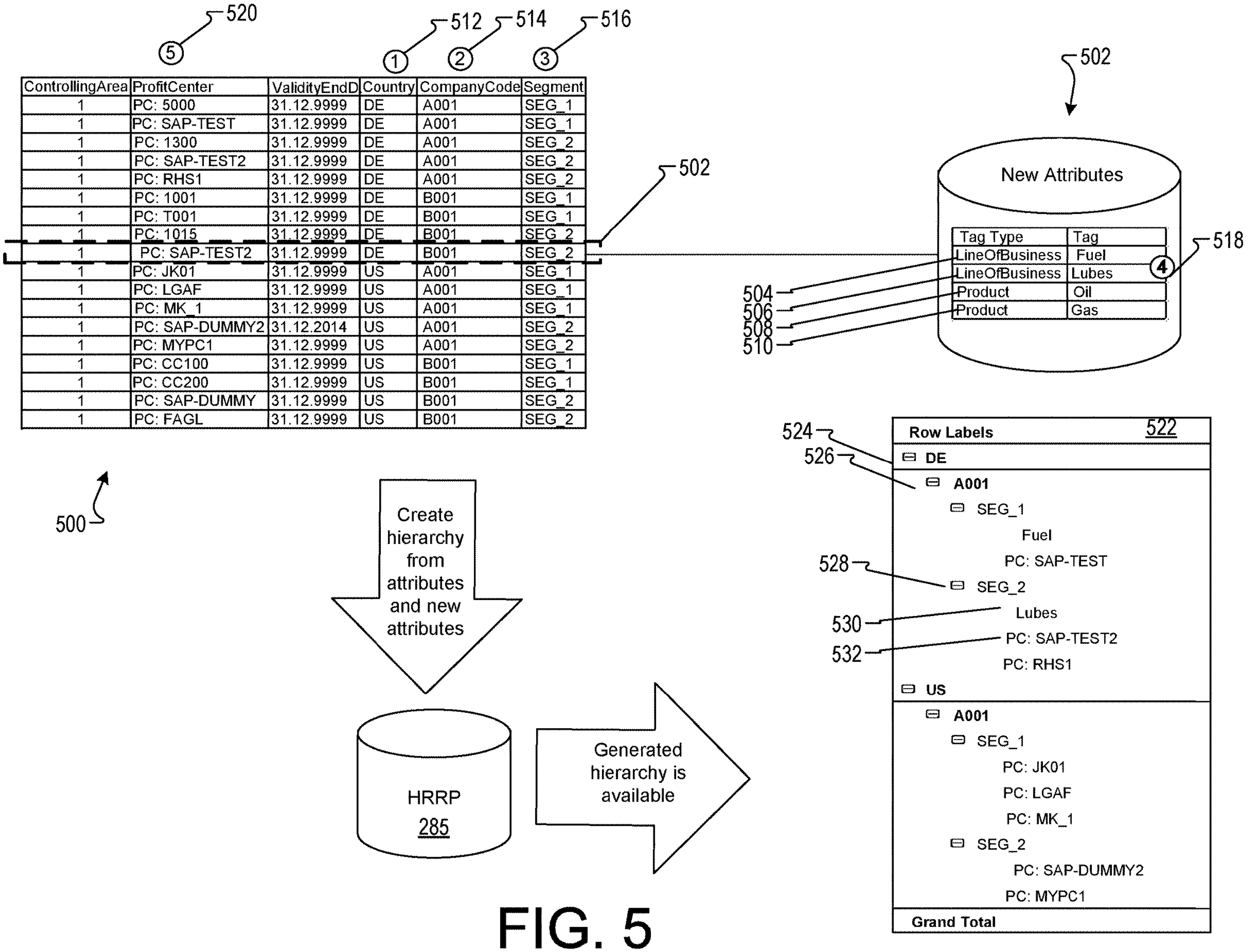

| ControllingArea | ProfitCenter | ValidityEndD | Country | CompanyCode | Segment |
|---|---|---|---|---|---|
| 1 | PC: 5000 | 31.12.9999 | DE | A001 | SEG_1 |
| 1 | PC: SAP-TEST | 31.12.9999 | DE | A001 | SEG_1 |
| 1 | PC: 1300 | 31.12.9999 | DE | A001 | SEG_2 |
| 1 | PC: SAP-TEST2 | 31.12.9999 | DE | A001 | SEG_2 |
| 1 | PC: RHS1 | 31.12.9999 | DE | A001 | SEG_2 |
| 1 | PC: 1001 | 31.12.9999 | DE | B001 | SEG_1 |
| 1 | PC: T001 | 31.12.9999 | DE | B001 | SEG_1 |
| 1 | PC: 1015 | 31.12.9999 | DE | B001 | SEG_2 |
| 1 | PC: SAP-TEST2 | 31.12.9999 | DE | B001 | SEG_2 |
| 1 | PC: JK01 | 31.12.9999 | US | A001 | SEG_1 |
| 1 | PC: LGAF | 31.12.9999 | US | A001 | SEG_1 |
| 1 | PC: MK_1 | 31.12.9999 | US | A001 | SEG_1 |
| 1 | PC: SAP-DUMMY2 | 31.12.2014 | US | A001 | SEG_2 |
| 1 | PC: MYPC1 | 31.12.9999 | US | A001 | SEG_2 |
| 1 | PC: CC100 | 31.12.9999 | US | B001 | SEG_1 |
| 1 | PC: CC200 | 31.12.9999 | US | B001 | SEG_1 |
| 1 | PC: SAP-DUMMY | 31.12.9999 | US | B001 | SEG_2 |
| 1 | PC: FAGL | 31.12.9999 | US | B001 | SEG_2 |

| Tag Type | Tag |
|---|---|
| LineOfBusiness | Fuel |
| LineOfBusiness | Lubes |
| Product | Oil |
| Product | Gas |

FIG. 5

Channel Analysis 702

| Profit Center | Distribution Channel | Amount in CC Crcy |
|---|---|---|
| − China 706a | On-line | 4.00 EUR |
| | Nor assigned | 700.00 EUR |
| − 010 708a | Super Market | 1,315.00 EUR (712) |
| | Direct Sales | 900.00 EUR |
| | On-line | 4.00 EUR |
| PC1009 | Super Market | 1,315.00 EUR |
| | Direct Sales | 900.00 EUR |
| | On-line | 4.00 EUR |
| + 020 710a | Not assigned | 700.00 EUR |
| + Hong Kong | Not assigned | 800.00 EUR |
| + Japan | Not assigned | 1,000.00 EUR |

Channel and Product Analysis 704

| Profit Center | Distribution Channel | Material | Amount in CC Crcy |
|---|---|---|---|
| − China 706b | Super Market | Mobil Silver | 100.00 EUR |
| | Direct Sales | Mobil Silver | 900.00 EUR (716) |
| | On-line | Mobil No.1 | 4.00 EUR |
| | Not assigned | Not assigned | 700.00 EUR |
| − 010 708b | Super Market | Superb | 1,215.00 EUR (714) |
| | | Mobil Silver | 100.00 EUR |
| | Direct Sales | Mobil Silver | 900.00 EUR |
| | On-line | Mobil No.1 | 4.00 EUR |
| PC1009 | Super Market | Superb | 1,215.00 EUR |
| | | Mobil Silver | 100.00 EUR |
| | Direct Sales | Mobil Silver | 900.00 EUR |
| | On-line | Mobil No. 1 | 4.00 EUR |
| + 020 710b | Not assigned | Not assigned | 700.00 EUR |
| + Hong Kong | Not assigned | Not assigned | 800.00 EUR |

Channel, customer analysis

| Profit Center | Distribution Channel | Material | Amount in CC Crcy |
|---|---|---|---|
| – China 802 | Super Market | M05037 GmbH | 1,215.00 EUR |
| | Direct Sales | Not assigned | 900.00 EUR |
| | On-line | AA | 4.00 EUR |
| | Not assigned | Not assigned | 700.00 EUR |
| – 010 804 | Super Market | MO1036 Vertrieb | 100.00 EUR |
| | | M05037 GmbH | 1,215.00 EUR |
| | Direct Sales | Not Assigned | 900.00 EUR |
| | On-line | AA | 4.00 EUR |
| PC1009 806 | Super Market | MO1036 Vertrieb | 100.00 EUR |
| | | M05037 GmbH | 1,215.00 EUR |
| | Direct Sales | Not Assigned | 900.00 EUR |
| | On-line | AA | 4.00 EUR |

FLEXIBLE ORGANIZATIONAL HIERARCHY

TECHNICAL FIELD

The description, in particular, relates to systems and techniques for providing interactive modification of hierarchies pertaining to data attributes of an enterprise resource planning (ERP) software application executing on a computing device.

BACKGROUND

Implementing organizational changes can be time consuming and complex. An enormous amount of effort may be expended to set up and build newly organized databases because each and every accessible organizational unit in a current database will be analyzed and updated based on requested changes. Each entity associated with a database may utilize the data differently and may use differing naming conventions for the data, which can lead to additional complexity when changes to the underlying databases are requested and implemented. Consideration is now given to a flexible mechanism for providing organizational hierarchies for data.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method for providing a flexible data hierarchy is described. The method describes providing a flexible data hierarchy. The method may include obtaining a plurality of data sets, the plurality of data sets including system-defined attributes and user-defined attributes, generating, for each attribute in each data set, a field for receiving input, providing, in a user interface display, at least one data set of the plurality of data sets and the generated field for each attribute in the at least one data set, receiving, in two or more of the generated fields, a value indicating a sequence placement for a respective attribute associated with a respective field of the two or more generated fields, and automatically generating, for the attributes associated with the two or more fields having a value, at least one hierarchical structure according to the sequence placement. Other embodiments of this aspect include corresponding computer systems, apparatus, and computer programs recorded on one or more computer storage devices, each configured to perform the actions of the methods.

Implementations may include one or more of the following features. The method further including receiving a query directed to at least one attribute associated with the two or more fields having a value and generating at least one report based on the at least one hierarchical structure. The at least one report may include attribute names and attribute values defined by the attributes associated with the two or more fields having a value. In some implementations, the at least one report depicts, in the user interface, portions of the at least one data set ordered according to the hierarchical structure. The method may also include having the at least one hierarchical structure modified and stored as a second hierarchical structure for the at least one data set, in response to receiving one or more values for additional attributes in the at least one data set.

The method may further include providing the at least one data set, in response to receiving a request to access financial data. In response to receiving one or more user-defined attributes and a value indicating a sequence placement for each user-defined attribute, the method may include updating the at least one hierarchical structure. The updated hierarchical structure includes a display order for each attribute that includes a value in the generated field. The method may also include receiving a validity date range for the at least one hierarchical structure. The validity date range may include a time period in which the at least one hierarchical structure provides valid information. The method may also include storing the at least one hierarchical structure with the validity date. The method may also include retrieving the hierarchical structure and generating at least one report according to the hierarchical structure, in response to receiving a query that pertains to the attributes corresponding to the hierarchical structure and a data within the validity date range.

Other embodiments of the above aspects include corresponding computer systems, apparatus, and computer programs recorded on one or more computer storage devices, each configured to perform the actions of the methods.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

FIG. 4 is an example screenshot depicting assignment of hierarchy levels to master data attributes, in accordance with the principles of the present disclosure.

FIG. 5 is an example depicting generation of a flexible organizational hierarchy in master data representing finance attributes, in accordance with the principles of the present disclosure.

FIG. 7 is an example screenshot depicting a flexible organizational hierarchy for use in analyzing data, in accordance with the principles of the present disclosure.

FIG. 8 is an example screenshot depicting a flexible organizational hierarchy for use in analyzing data, in accordance with the principles of the present disclosure.

Like reference symbols in the various drawings indicate like elements.

DETAILED DESCRIPTION

Figure 1:
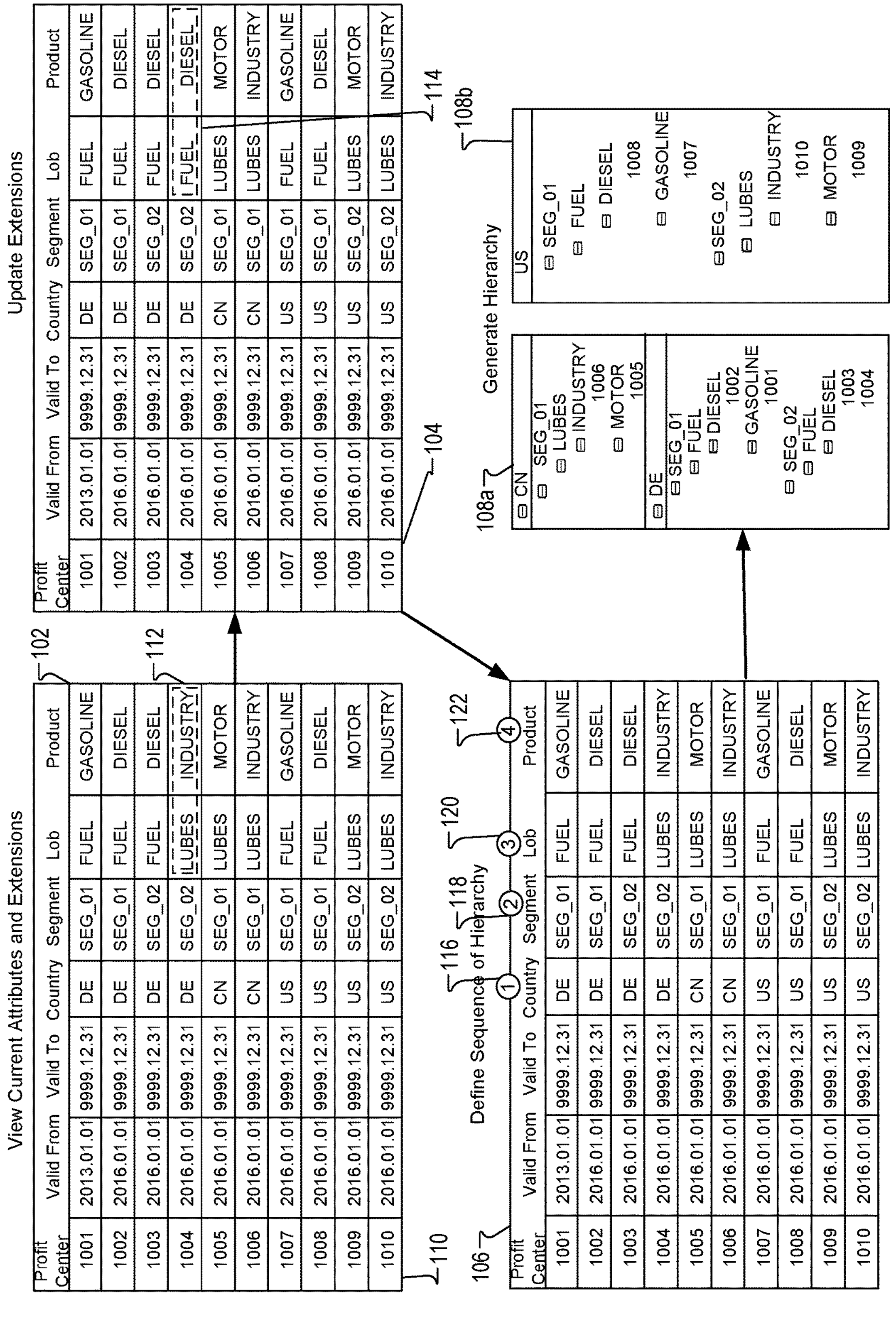
FIG. 1 is an example illustrating generation of a flexible hierarchy from a number of tables representing profit center data in accordance with the principles of the present disclosure.

In an Enterprise Resource Planning (ERP) system, information can be organized into structures having any number of attributes that represent aspects of a data for a company. The attributes may be hierarchically organized to define an order of importance for various levels and types of data describing company products, personnel, revenue, forecasts, processes, etc. In the systems described herein, the order of importance may be system-defined or user-defined and can be modified repeatedly, as particular hierarchy change is desired. In particular, the systems and methods described herein can construct flexible organizational hierarchies based on ordering of attributes associated with such data. The attributes may be system-defined or user-defined. The user can label or otherwise identify a sequence that is stored with specific attributes, attribute types, or attribute values (or fields associated with the attributes) to define a hierarchy within the data.

Using such labeling, the systems and methods described herein enable users to define and/or select a specific hierarchy (e.g., sequence that defines order) for master data. The defined data sequence order can be used to sort data, report data, or otherwise customize data associated with the master data. The data sequence order dictates the intended hierarchy for the master data when the master data is output in a software application (or report).

Allowing for user-definable hierarchies can provide an advantage of easily updating data (e.g., attribute values) and hierarchy assignment associated with master data in order to provide rapid generation of different attribute-value based hierarchies of the master data for different reporting purposes. Generation of the hierarchies can be applied to any dataset that can be built based upon a list of attributes. Because the definition defines data on a per level basis, a drill down to the attribute level is possible. The drill down can be used to generate new data, reports, and/or other variants of the data according to a modifiable hierarchy.

In some implementations, the flexible hierarchy may be defined by a user in a sequence definition. A sequence definition may be indicated by number, symbol, letter, etc., on an attribute or attribute value to indicate that the attribute (or value) is of interest and ordered according to the indication with respect to indications on other attributes within a data set, for example. The sequence definition can be used to generate any number of organizational hierarchies based on an order assigned to attributes of data (e.g., master data) in the definition. In some implementations, the assigned order may be a user-defined ordering of attributes associated with the data. The attributes and the order defined in the sequence definition can be used to generate a definition for the hierarchy of attributes within the master data. Such hierarchies can be used to define reporting structures for generating and outputting reports (or other data related to master data content). For example, if a sequence definition for a profit center attribute defines a geography attribute as a first level of hierarchy, a product type as a second level of hierarchy, and a product name as a third level of hierarchy, then a report generated using such a sequence definition may include a hierarchically listed report with one or more geographical locations as first line items in the report, one or more product types as indented second line items in the report, and one or more product names as indented third line items in the report. While indentation is typically utilized in the art to indicate a hierarchy, other display methods to indicate hierarchical data are possible.

In some implementations, particular attributes may be subdivided according to categories defined by users of the ERP software executing on an ERP system. The organization of information may be based on master data that defines the attributes available for a particular category (or organizational unit) associated with the company. For example, master data can be used to generate an organizational structure shared across a company (e.g., enterprise). The organizational structure may represent data stored hierarchically according to the sequence definition that is defined and applied by the user of the system. The data may include static reference data, transactional data, unstructured data, analytical data, and/or metadata.

In some implementations, the systems and methods described herein enable users to insert user-defined attributes into ERP system-defined master data records. Once the user-defined attributes are included in a master data record, the updated record can be configured to present data in a user-defined hierarchical order. That is, the systems and methods allow for users to insert ranking data (e.g., values in fields, ordering of attributes) upon attributes within a master data record (on both user-defined and system defined attributes). The ranking data can enable modification of the master data records for purposes of allowing variable and flexible sorting, reporting, and customizing of a structured hierarchy of the master data. For example, the ranking may be applied to system-defined and/or user-defined attributes, which can then be pulled into a report according to the user-selected ranked hierarchical order. The ranking may include a labeling of attributes, a tagging of attributes, an ordering/defining of tables of attributes, a metadata indication, or other indicator to define an ordering of importance of data attributes.

Referring to FIG. 1, a number of tables 102, 104, and 106 are shown that represent example attributes of example master data for finance software applications associated with an ERP system. Each line in the tables includes an attribute of master data for the profit center. The user may define attributes and may generate sequence definitions to specify the order in which these attributes shall be used to automatically generate the hierarchy of data. Example hierarchies **108*a* and 108*b* may be generated using the sequence definitions, tables 102-106, and user selections. Additional hierarchies may also be generated. Two example hierarchies 108*a* and 108*b* are depicted in FIG. 1** for illustration purposes, but any number of hierarchies may be generated using the systems and methods described herein.

In general, master data may be represented by one or more master data tables. Such tables can be organized according to types of master data. Example master data types that may be associated with finance software applications may include, but are not limited to cost center master data, profit center master data, company code master data, controlling area master data, work breakdown structure element master data, etc. In general, each type of master data may include attributes defined by ERP software applications in one or more records.

Master data can include tables with rows and columns of data. In some implementations, rows represent members of an entity while columns represent attributes describing data objects associated with the entity. In general, attributes may represent objects that are contained in a master data service entity. In one example, an attribute may be a column in an entity table (e.g., table 102 is an entity table with attributes of “profit center”, dates “valid from” and “valid to” as well as “country”, “segment”, line of business “(LOB)” and “product.” An attribute value may represent the value used to describe a specific member. In table 102, an example attribute value may include “1010” 110. In some implementations, attribute values may describe the members of the entity. In one example, an attribute can be used to describe a leaf member, a consolidated member, or a collection.

When generating an entity that contains many attributes, the attributes can be organized into attribute groups. In addition, a name attribute and a code attribute may be automatically generated upon generating an entity. The code includes a value that is unique within the entity. In one non-limiting example, there may be three types of attributes: free-form attributes, domain-based attributes, and file attributes. Free-form attributes allow free-form input for text, numbers, dates, or links. Domain-based attributes may be populated by entities. File attributes, which can be used to store files, documents, or images. File attributes are intended to help with the consistency of data by ensuring that files have a specific extension.

As shown in table 102, an entity may include example attributes of “profit center”, dates “valid from” and “valid to” as well as “country”, “segment”, line of business “(LOB)” and “product.” These attributes describe the members. Each member is represented by a single row of attribute values. In the example table 102, system-defined attributes may have included profit center, country, and segment of a country. A user may have added attributes line of business “(LOB)” and “Product.” Thus, users can extend the table of attributes and the extended attributes can be utilized with system-defined (e.g., attributes pre-delivered by SAP HANA® for example).

Using an organizational hierarchy in a finance application (shown in FIG. 2C), the user can access and/or add fields (e.g., attributes) to master data. For example, the user can add one or more attributes to existing master data. The user can then access master data table 102 using the finance application, select a particular organizational hierarchy type, and update one or more field values/attribute values in the table. In the example depicted in FIG. 1, the user has selected two attribute values at box 112 (e.g., LOB “LUBES” and product “INDUSTRY”) and has entered updates of “FUEL” and “DIESEL,” respectively shown at box 114.

Next, the user may assign a ranking (e.g., hierarchy level) for one or more fields/attributes. In the example table 106, the user selected country as a first level 116, segment as a second level 118, LOB as a third level 120, and product as a fourth level 122. Upon completing the assignments, the user can request a hierarchy to be generated from the table 106. The systems and methods described herein can generate the hierarchy from the attributes and levels indicated by the user.

As shown, hierarchy 108*a* depicts a hierarchy for attribute value CN (i.e., China) to be organized according to country, then segment, line of business, and finally product (e.g., CN-SEG_01-LUBES-INDUSTRY-MOTOR). Similarly, for attribute value DE (i.e., Germany), the hierarchy is organized according to the selected levels with the country first, the segment, line of business, and product. (e.g., DE-SEG_01-FUEL-DIESEL-GASOLINE. In the second portion of the DE example, the change of the line of business and the product has been implemented in the hierarchy (e.g., SEG_02-FUEL-DIESEL. For attribute value US (i.e., United States of America), the hierarchy is implemented in order of assigned levels 116-122 (e.g., US-SEG_01-FUEL-DIESEL-GASOLINE AND SEG_02-LUBES-INDUSTRY-MOTOR. In each example in the hierarchies 108*a* and 108*b*, the fields not ordered and/or selected are placed last in the hierarchy.

The assigned levels are translated into the hierarchy and stored according to time dependency information. For example, a timestamp associated with a date and time in which a user assigns the hierarchy can be stamped with the master data. That way, reporting can be generated at any time and take into account system changes based on date.

The ability to assign flexible hierarchies to master data can provide an advantage of rapid and efficient defining of new hierarchies for large amounts of data without having to reorganize how the data is stored. In one example, a hierarchy can be maintained if a user modifies an existing attribute name or value. Similarly, the hierarchy can be changed based on obsolescence of a particular attribute name or value. In some implementations, a flexible data hierarchy can improve performance of a hierarchy aggregation calculation.

In some implementations, the systems and methods described herein can provide an implementation of a flexible and modifiable hierarchy for data in lieu of having to assign particular attributes manually based on other changes within the data. In particular, as shown in table 102, rather than assigning each and every profit center to a new hierarchy, the user can instead define the order of the applied levels (e.g. as a sequence of attributes). Setting up a new hierarchy based on sequence definitions (e.g., based on Segment→LineOfBusiness→Country). The sequence definition can also provides rapid and efficient way to set up different hierarchies in parallel by using a different sequence of attributes. For example, a company may wish to begin a report with a segment attribute being the first hierarchical level. At other times, the company may wish to begin a report with the line of business as the first hierarchical level. The systems and methods described herein allows a flexible modification of such data based on defining sequence orders for data within master data records.

In some implementations, sequence definitions that provide hierarchical organization may be date-dependent. For example, a date can be associated with a specific hierarchy (based on a sequence definition selected by a user). The data may include rules for a date in which a particular hierarchy should be valid. The date may include a begin and an end date, should the hierarchy become obsolete based on new system information. Reports can be generated using such dates. Therefore, historical reports can be generated at any time. This can provide an advantage of being able to generate reports for specific combinations that capture business information at any point in time.

The time-dependency of particular hierarchies can enable older versions of defined hierarchies can be accessed even after the master data has been modified. Master data may be modified in an organizational change, but earlier hierarchy version can be utilized to provide accurate data for an entered time period. In some implementations, custom hierarchies can be generated to provide a way for users accessing content in the future to create hierarchies for custom fields.

Figure 2A:
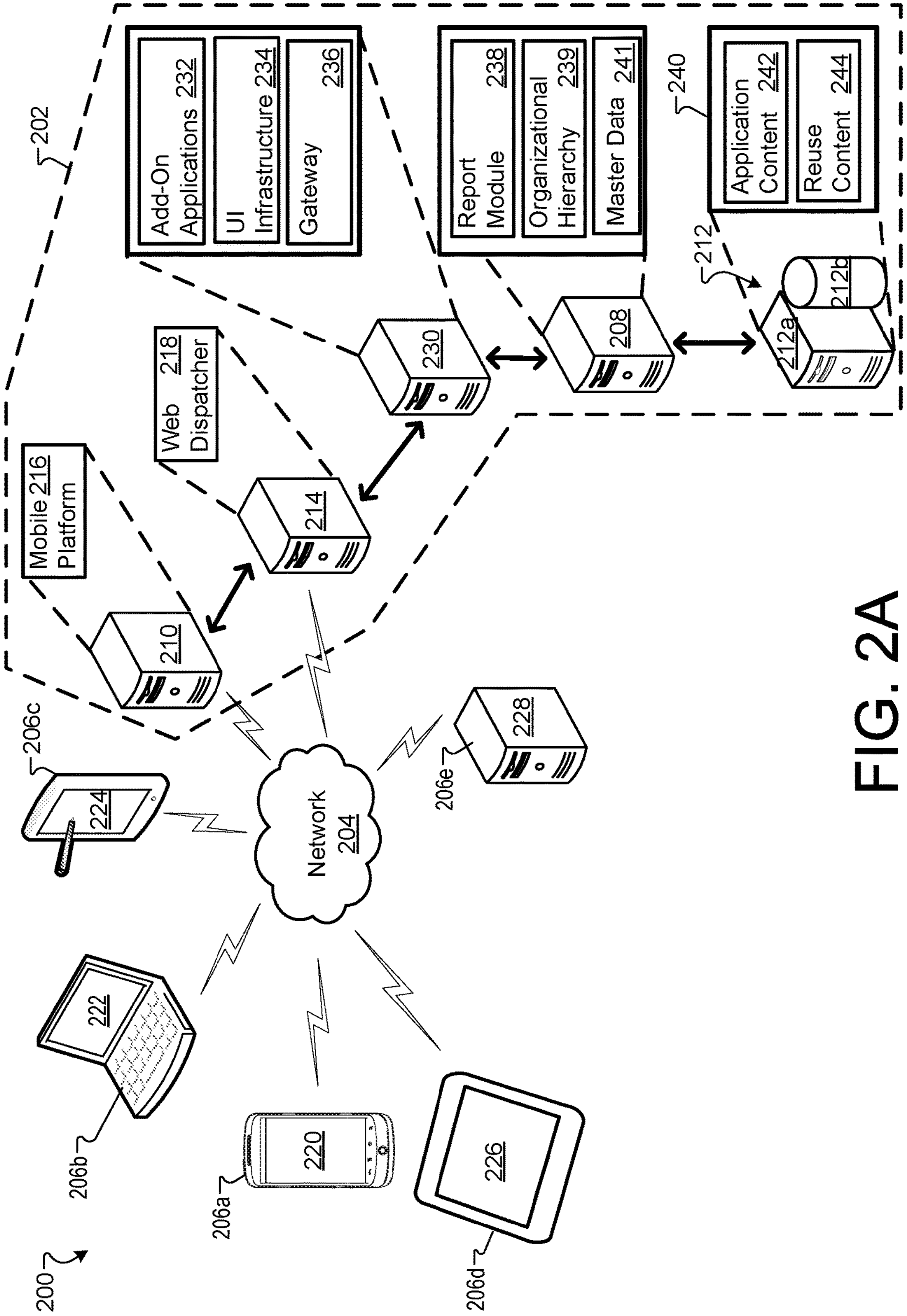
FIGS. 2A-2C are block diagrams representing an example system for implementing user interfaces and implementing updates to organizational hierarchies in accordance with the principles of the present disclosure.

FIG. 2A is a diagram of an example system 200 that can implement the user interfaces and user experiences described herein. The system 200 includes an enterprise computing system 202, at least one network 204, and client computing devices 206*a*-*e*. Computing device 206*a* can be a mobile phone, a smartphone, a personal digital assistant, or other type of mobile computing device. The computing device 206*a* includes a display device 220. Computing device 206*b* can be a laptop or notebook computer. The computing device 206*b* includes a display device 222. The computing device 206*c* can be a tablet computer. The computing device 206*c* includes a display device 224. The computing device 206*d* can be a wearable device such as a smartwatch. The computing device 206*d* includes a display device 226. The computing device 206*e* can be a desktop computer. The computing device 206*e* can include a display device 228. A user of the computing devices 206*a-e* can use/interface with the display devices 220, 222, 224, 226, and 228, respectively, when interacting with the enterprise computing system 202. The computing devices 206*a-e* can display on the display devices 220, 222, 224, 226, and 228 and/or any of the screens and UIs described herein.

The enterprise computing system 202 can include one or more computing devices such as a web management server 214, a frontend server 230, a backend server 208, and a mobile device management server 210. The enterprise computing system 202 can also include a database management computing system 212 that includes a database management server 212*a* and a database 212*b*. Though not specifically shown in FIG. 2A, each server (the web management server 214, the frontend server 230, the backend server 208, the mobile device management server 210, and the database management server 212*a*) can include one or more processors and one or more memory devices. Each server can run (execute) at least one server operating system.

In some implementations, the client computing devices 206*a-d* (e.g., the mobile computing devices) can communicate with the enterprise computing system 202 (and the enterprise computing system 202 can communicate with the client computing devices 206*a-d*) by way of the mobile device management server 210. The mobile device management server 210 includes one or more mobile device platform application(s) 216. By using the mobile device platform application(s) 216, the enterprise computing system 202 can deliver cross-platform, secure, and scalable applications to the computing devices 202*a-d*, independent of the mobile computing device-type (e.g., laptop, notebook, smartwatch, mobile phone, PDA, etc.) and independent of the operating system running on the computing device 206*a-d*. In these implementations, the mobile device management server 210 can then communicate with the web management server 214.

In some implementations, the client computing devices 206*a-e* (both the mobile computing devices (computing devices 206*a-d*) and the desktop computing device 206*e*) can communicate with the enterprise computing system 202 (and specifically with the web management server 214), and the enterprise computing system 202 (and specifically with the web management server 214) can communicate with each of the client computing devices 202*a-e*) using the network 204. The web management server 214 includes a web dispatcher application 218. In some implementations, the web dispatcher application 218 can act as a "software web switch" accepting or rejecting connections to the enterprise computing system 202.

In some implementations, the network 204 can be a public communications network (e.g., the Internet, cellular data network, dialup modems over a telephone network) or a private communications network (e.g., private LAN, leased lines). In some implementations, the computing devices 206*a-e* can communicate with the network 204 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The frontend server 230 can include product specific UI Add-On Applications 232 and a UI infrastructure 234. The UI infrastructure 234 can include a design portion and a runtime portion. The frontend server 230 can decouple a lifecycle of a UI (e.g., design and runtime deployment) from the backend server 208.

The frontend server 230 also includes a gateway 236. The gateway 236 can provide a way to connect devices, environments, and platforms to enterprise software based on market standards. The gateway 236 can enable the development of UIs for use in different environments (e.g., social and collaboration environments). The gateway 236 can enable the development of UIs for use on different types of client computing devices (e.g., client computing devices 206*a-e*). The gateway 236 can enable the development of UIs for use in internet-based applications.

The backend server 208 can include a bundle (a set) of business applications (e.g., business suits). The business applications can be transactional applications. Analytical applications, and fact sheet and contextual navigation applications. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

In some implementations, the ERP system can utilize master data hierarchies to generate particular reports (e.g., output) using report module 238, for example. The format of such output generated in the ERP system may rely on hierarchical structure defined by the master data. Master data may be defined using any number of attributes and/or measures. Attributes may represent fields, subsets of information, or other criterion used to describe a particular aspect of data. For example, attributes of a customer attribute may include a customer type, an address, a term, or a credit score. Measures may represent numbers or values for tangible analysis. Measures may represent a set of values that can be measured, quantified, and/or calculated.

The backend server 208 may also include an organizational hierarchy 239. The organizational hierarchy 239 may define and modify the structure of the organizational units within a company for the purposes of internal controls. The hierarchical structure defined by the master data (and applied to generated output) may be constructed on one or more attribute value of a master data record, including both ERP system-defined/delivered attributes as well as user defined/extended attributes. For example, a hierarchy can be defined using ERP system-generated attributes and by user-defined attributes. Frequent updates to the attribute values of the master data may be used to build different attribute-value-based hierarchies of the master data for different output (e.g., reporting) purposes. Such frequent updates may benefit from a flexible organizational hierarchy.

The organizational hierarchy may be generated using an organizational hierarchy application program 239. Such a program 239 may be used to define and associate master data with queries. The organizational hierarchy program 239 can rapidly design hierarchy from master data attributes and extension fields. In addition, the program 239 may use pre-design filter conditions to filter out master data, and may scan master data, organize the data according to a structure sequence one by one in order to form the hierarchy structure. Users may use the organizational hierarchy application program 239 to download and upload data to customize the master data. The program may also support generation of queries in time to show the query result in a query report, for example.

The backend server 208 may also house master data 241. Master data can include tables with rows and columns of data. In some implementations, rows represent members of an entity while columns represent attributes describing data objects associated with the entity. In general, attributes may represent objects that are contained in a master data service entity. In one example, an attribute may be a column in an entity table that includes attribute values in cells of the table. An attribute value may represent the value used to describe a specific member. In some implementations, attribute values may describe the members of the entity. In one example, an attribute can be used to describe a leaf member, a consolidated member, or a collection.

The database management computing system 212 includes a database management server 212*a* that can run (execute) applications that can manage a database 212*b*. For example, the database 212*b* can be an in-memory, column-oriented, relational database (e.g., SAP HANA®). The database management computing system 212 can include extended application services 240 that can embed a full featured application server, web server, and development environment within the database management computing system 212. The extended application services 240 can include application content 242 and reuse content 244 for use by the enterprise computing system 202 when providing a personalized, responsive, and simple UX across different types of computing devices and deployment options.

Figure 2B:
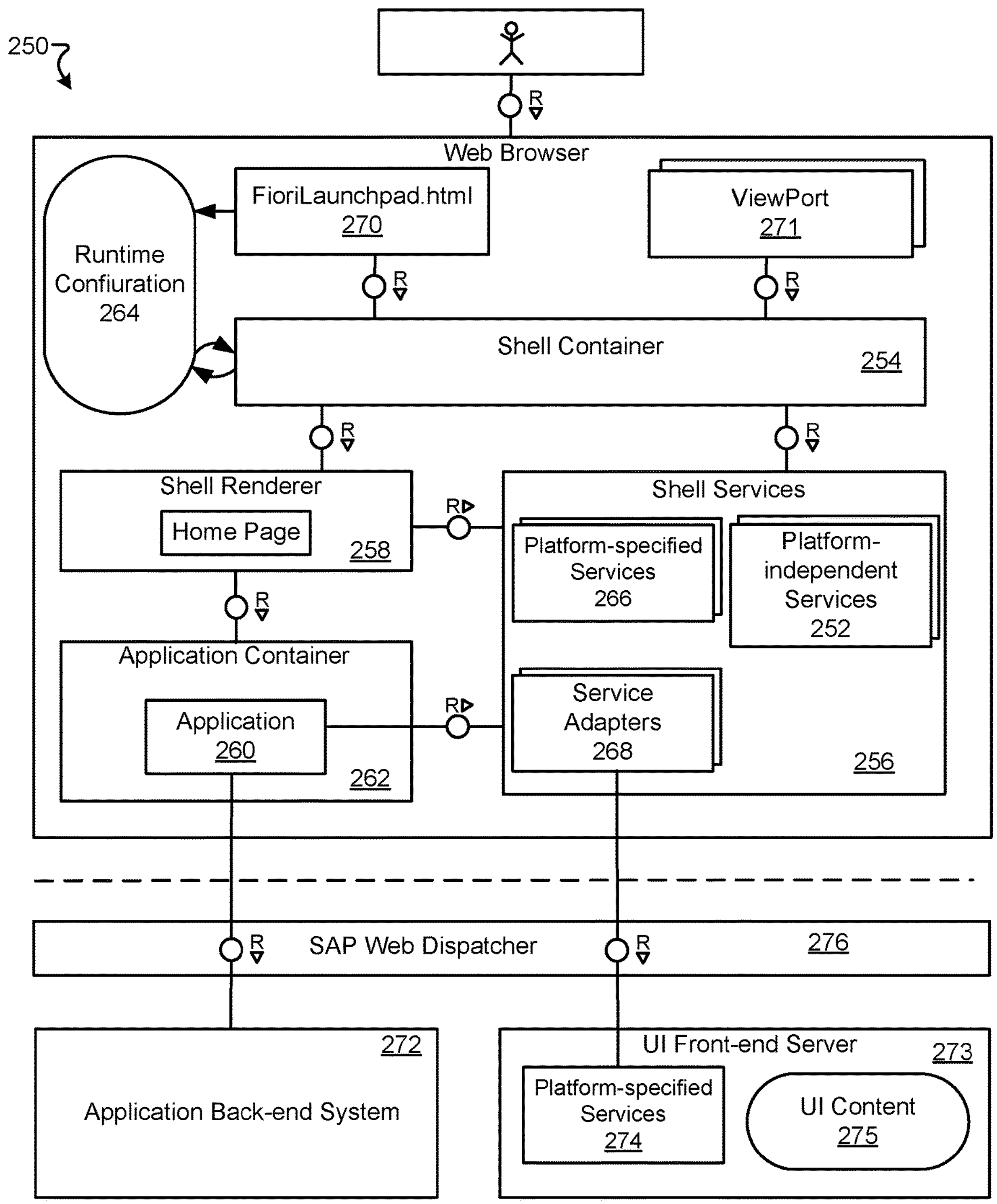

FIG. 2B is a diagram of an example system 250 for implementing user interfaces for generating flexible organizational hierarchies in accordance with the principles of the present disclosure. In operation, the system 250 may implement a runtime shell environment for applications and/or or apps in which the personalized home page is one feature among many other services. The system 250 may provide a single, platform-independent, client-side runtime environment which can be hosted on different server platforms (e.g., SAP NETWEAVER®, AS ABAP®, SAP HANA® XS, SAP HANA® CloudPlatform).

In general, the framework described herein may support for modularizing comprehensive JavaScript applications. That may indicate that, instead of defining and loading one large bundle of JavaScript code, an application can be split into smaller parts which then can be loaded at runtime at the time when they are requested. These smaller individual files are called modules.

A module is a JavaScript file that can be loaded and executed in a browser. The module may include a name, a description, a dependency, and a declaration location. The content bundled in a module is up to the developer, but typically the content has a common topic, such as forming a JavaScript class or namespace or the contained functions address a specific topic, for example client to server communication or mathematical functions.

Modules have no predefined syntax or structure, but module developers can use the name, declaration, description, or dependency to identify such modules. The name identifies the module and is used with jQuery.sap.require to load the module. As human readers associate a module with the main JavaScript object declared in it, the module names by convention are a hierarchical sequence of dot-separated identifiers like sap.ui.core.Core. A developer can use all but the last identifier to group modules in a logical and/or organizational order, similar to packages in Java, and can use the last identifier to give the module a semantical name.

Modules can declare themselves and their location of content by calling the static jQuery.sap.declare function with their name. This helps SAPUIS to check at runtime whether a loaded module contains the expected content by comparing the required name against the declared name. As a side effect, jQuery.sap.declare ensures that the parent namespace of the module name exists in the current global namespace (window). For modules without declaration, the framework assumes that the module has the expected content and declares it with the name that was used for loading.

Modules can use the jQuery.sap.require method to load other modules they depend on. While jQuery.sap.require internally has the effect of a loadModule call, it can also be regarded as a dependency declaration. The dependency declarations can be evaluated at runtime, but can also be analyzed at built time or at runtime on the server.

In one example, the unified shell offers unified services with platform-independent interfaces (APIs) (e.g., services 252) to the hosted apps and shell components. The implementations of these services can utilize different service adapters for the respective platform to carry out platform-specific behavior. The unified shell can be enabled using a shell container 254, shell services 256, and a shell renderer 258. In some implementations, the shell container may be independent of shell services 256 by utilizing the shell renderer 258.

Applications (e.g., apps) 260 may be embedded in an application container 262. As this is an independent re-use component, the embedding aspect is decoupled from the renderer 258. The application container 262 can, for example, host SAPUIS components, Web Dynpro ABAP applications and SAP GUI for HTML transactions.

The shell services 256 and renderers 258 are managed by the central shell container 254. The shell container 254 utilizes a runtime configuration 264, which defines the concrete implementations for services 256, adapters 268, and shell renderer 258, as well as global settings like theme, language, system and user data. The runtime configuration 264 is fed by a number of settings, including, but not limited to static configuration settings in the hosting HTML page, dynamic configuration data read from the front-end server during startup, and/or dynamic settings passed as query parameters in the URL.

In some implementations, the JavaScript components shown in system 250 are embedded into a single HTML page. A Fiori launchpad implementation of the SAP NetWeaver ABAP front-end server may contain a standard page called, for example, Fiorilaunchpad.html 270, or other URL directed to one or more viewports 271. Users may create custom start pages which utilize the shell with different static configurations.

The web browser can use http data and OData to access application backend systems 272 and UI front-end server 273 (e.g., service implementations 274 and UI contact 275) via web dispatcher 276.

Figure 2C:
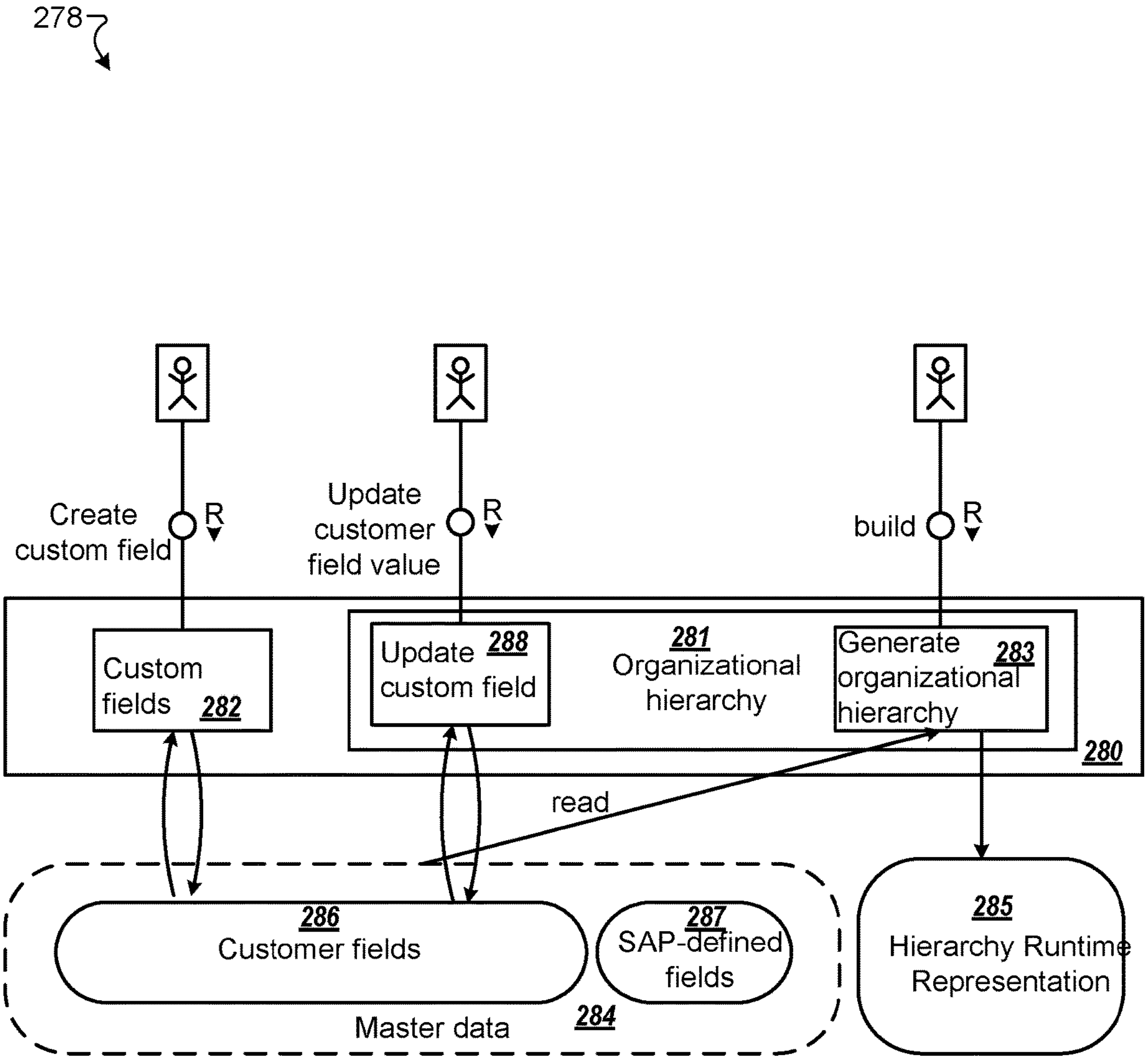

FIG. 2C is a block diagram representing an example system 278 for updating flexible organizational hierarchies for master data in accordance with the principles of the present disclosure. The system 278 includes an enterprise computing system 280 running an organizational hierarchy application 281 and a custom fields application 282.

The organizational hierarchy application 281 can be accessed to define and generate 283 an organization's hierarchy represented in master data 284 and may use a hierarchy runtime representation 285 to store each generated hierarchy and updates to such hierarchies.

The custom fields and logic application 282 can be accessed by users to generate and maintain custom fields and logic that can be used to enhance applications that have enabled their extensibility for system users. The custom fields and logic application 282 can be used to create a custom field in a business context of an ERP system 202, for example. The application 282 can be used to create an enhancement implementation for the business context where custom logic is to be executed. The application 282 can also be used to edit a custom field and to determine where a custom field is to be implemented. The application 282 can also provide search capabilities and translate capabilities for any number of existing or buildable fields in the ERP system 202, for example. The application 282 can additionally be used to implement custom logic in the enhancement implementation for particular users in a web-based editor.

In operation, a user may open the custom fields and logic application 282 to generate, access, update, and/or maintain customer fields 286 and SAP-defined fields 287. For example, if the user opens the custom fields and logic application 282, the system 278 can access master data 284 (including all customer fields 286 and SAP-defined fields 287). The user may choose to generate or update custom fields 288 and such actions can pass data between master data 284 and system 280 to generate or update such fields. Upon completion of updates to one or more fields, the user can choose to generate one or more organizational hierarchies by selecting an offered control to do so. Selection of such a control may trigger master data to be passed to system 280 to generate the hierarchy at 283 and store the hierarchy in hierarchy runtime representation 285. Upon completion, the user can generate data reports and informational aspects using the newly generated organizational hierarchy, as explained in further detail below.

Figure 3:
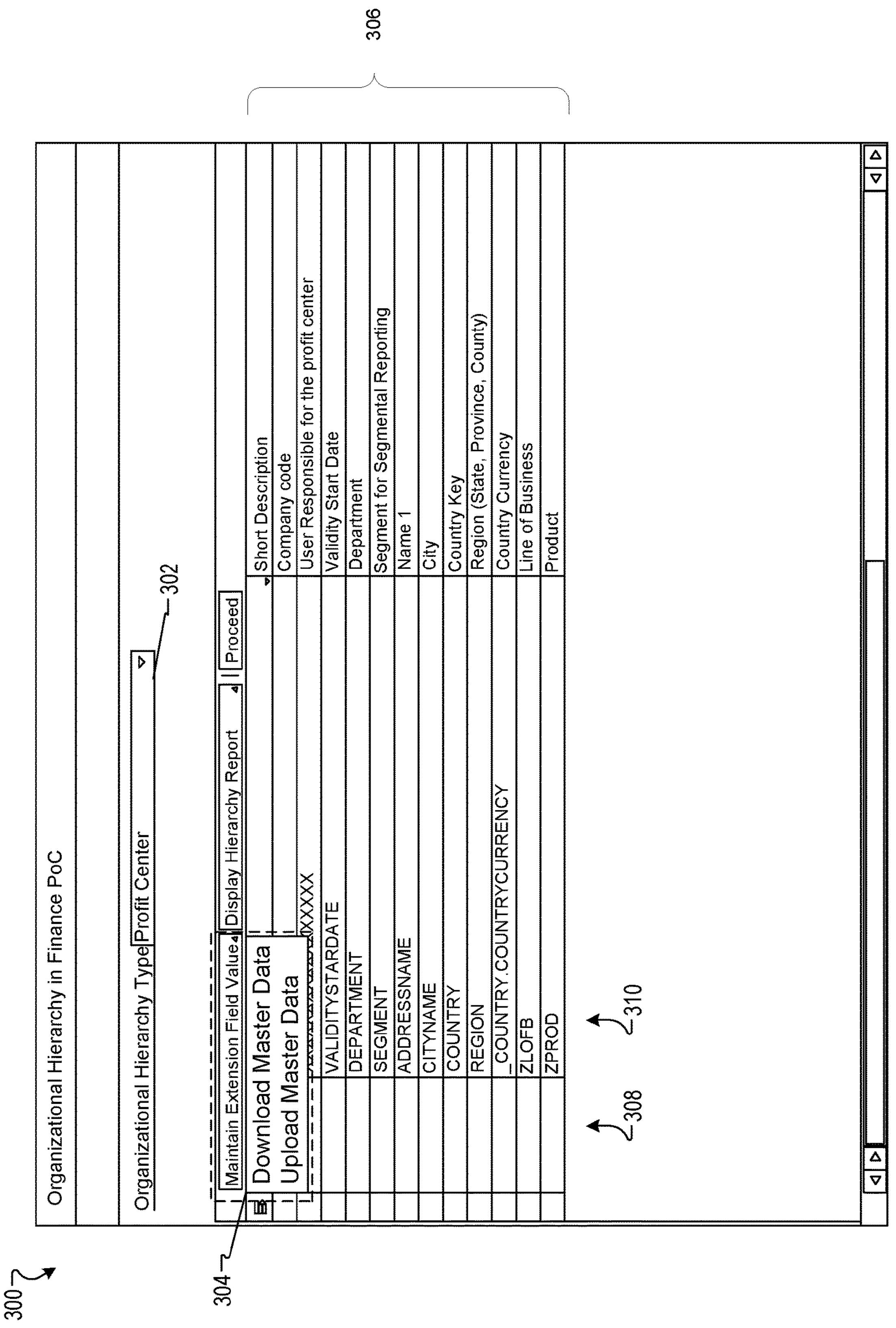
FIG. 3 is an example screenshot depicting an organizational hierarchy in a finance application for updating data fields, in accordance with the principles of the present disclosure.

FIG. 3 is an example screenshot 300 depicting an organizational hierarchy in a finance application for updating data fields, in accordance with the principles of the present disclosure. A user has entered the organizational hierarchy application 239 pertaining to finance data objects. The user has also selected a profit center attribute (representing an organizational hierarchy type), shown by a selection in a dropdown control 302. Upon selecting an attribute, the user may be presented options 304 and master data and attribute values and names 306 associated with the profit center attribute. The options 304 include downloading master data and uploading master data. Downloading master data can populate content 306, for example, (or additional available content pertaining to a selected organizational hierarchy type). Uploading master data may upload new attributes into the master data record. The user may proceed to enter hierarchy levels in column 308 for one or more of the attribute values shown in column 310.

FIG. 4 is an example screenshot 400 depicting assignment of hierarchy levels to master data attributes, in accordance with the principles of the present disclosure. In this example, at step one 402, a user has entered hierarchy levels 1-5 in column 404. Each hierarchy level pertains to at least one attribute in column 406. Here, the user has assigned a first hierarchy level to the COUNTRY attribute, a second hierarchy level to the REGION attribute, a third hierarchy level to the CITYNAME attribute, a fourth hierarchy level to the ZLOFB (line of business) attribute, and a fifth hierarchy level to the ZPROD (product) attribute. Note that the ZLOFB and the ZPROD attributes are user-defined attributes previously entered by the user for master data profit center.

At step two 408, the user can select a proceed control 410 to implement the changes entered in column 404. Upon selecting the proceed control 410, the systems described herein (e.g., systems 202/278) may provide a pop-up screen 412 offering to save the organization hierarchy type with the changes, at step three 414. Here, a key date, hierarchy ID, and hierarchy description can be saved along with the hierarchy type and master data record changes. The key date may pertain to when the generated hierarchy is valid and usable. Upon saving the hierarchy, a master data hierarchy level is generated for the data based on the selected master data field value(s) and its marked sequence for hierarchy level.

FIG. 5 is an example depicting generation of a flexible organizational hierarchy in master data representing finance attributes, in accordance with the principles of the present disclosure. In the depicted example, a master data table 500 is shown with controlling area, profit center, validity-end-date, country, company-code, and segment attributes. A user may wish to add one or more master data attributes and may do so, as shown by additional master data attributes 502. Additional (new) attributes 502 include line of business attributes with attribute values of Fuel 504 and Lubes 506. New attributes also include product attributes with values of Oil 508 and Gas 510.

After generating the new attributes, the user may assign a hierarchy for the master data. The assignment can be applied to system-defined attributes as well as user-defined attributes. In this example, the user has updated table 500, and applied a hierarchy that includes a first level 512 as Country, a second level 514 as Company-Code, a third level 516 as Segment, a fourth level 518 as Line of Business, and a fifth level 520 as Profit Center.

The hierarchy levels 1-5 (512-520) can be generated and applied to the attributes and the new attributes using hierarchy runtime representation 285. The generated hierarchy 522 lists the country (DE/US) at the first level 524, the company code at the second level 526, the segment at the third level 528, the line of business at the fourth level 530 and the profit center at the fifth level 532.

Figure 6:
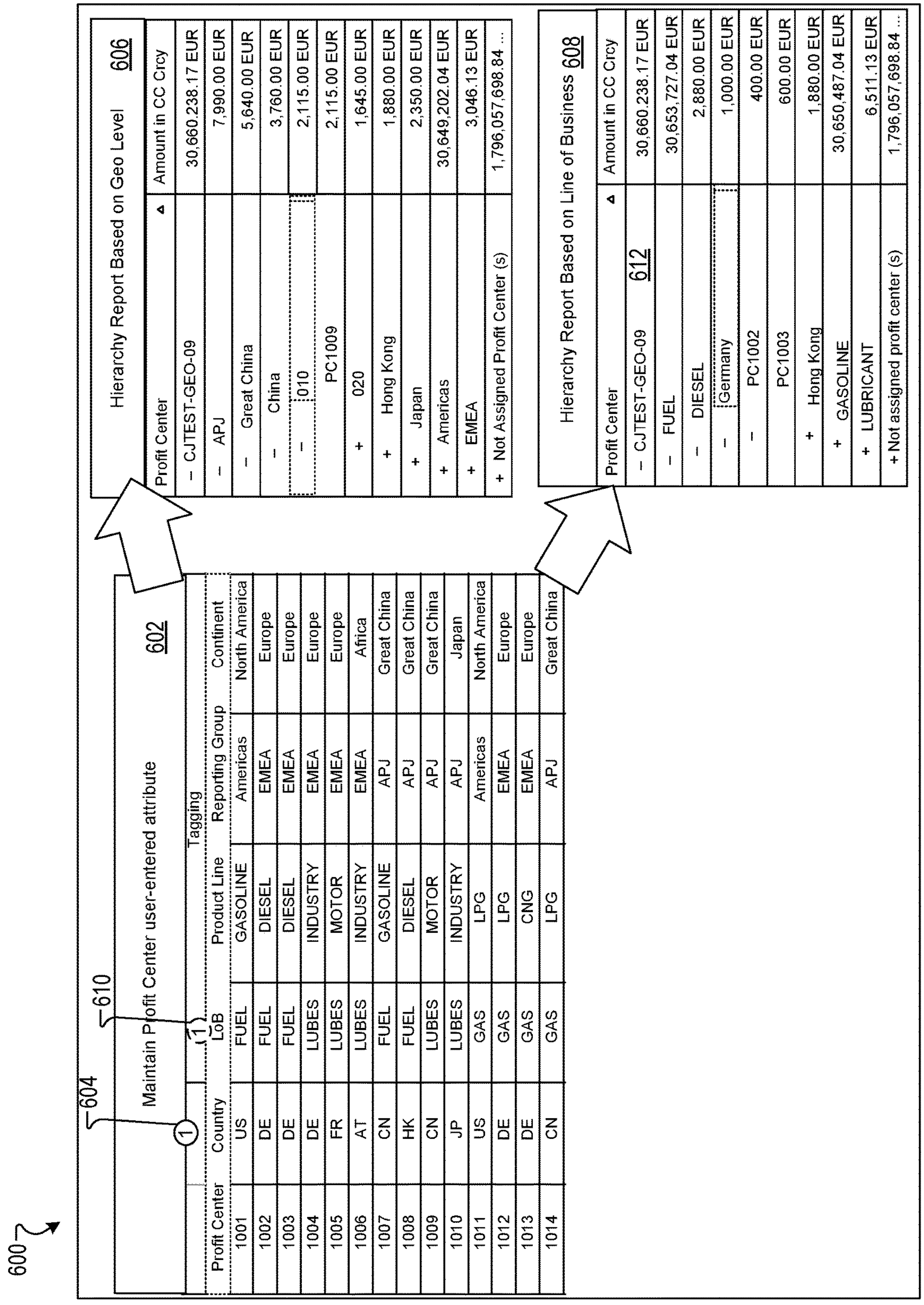
FIG. 6 is an example screen shot depicting generation of reports generated using a flexible organizational hierarchy, in accordance with the principles of the present disclosure.

FIG. 6 is an example screen shot 600 depicting generation of reports generated using a flexible organizational hierarchy, in accordance with the principles of the present disclosure. A list of master data with a list of attributes is shown in table 602. The list of attributes can be enhanced by users. In general, all attributes can be used simultaneously, whether they are user-defined or system-defined.

In this example, a user may have generated the profit center attribute and generated one or more attribute values using the organizational hierarchy application 239. The table 602 can maintain the user-defined profit center attribute. In some implementations, additional attributes can be added to the table 602. In some implementations, other tables can be generated to maintain other user-defined attributes.

The user can then define a hierarchy based on a sequence definition input into another column (not shown) of the table 602. An example of such a column is shown at column 404 in FIG. 4. The sequence definition can define any number of hierarchy levels. The user in the depicted example indicated that the country attribute is the first hierarchical level 604. This defined hierarchy and the data in table 602 can be used to generate report 606 and report 608. For example, report 606 is generated with a report based on the geographic location being the top level for the profit center attribute, as shown by the defined level 604. Here, each country (i.e., geographic location) is arranged in the report as a selectable topmost selectable attribute. All other information and attributes can be provided under each respective geographical report. The user here chose to see the amount of credit card currency by location.

In report 608, the user chose a first level 610 of the profit center attribute to be the top of the report hierarchy. The report 608 depicts the profit center attribute with the line of business 612 as the top of the report hierarchy. Each line of business for the profit center attribute may be listed as the top level of the report. Drill down into the other attributes can occur from that level.

FIG. 7 is an example screenshot depicting a flexible organizational hierarchy for use in analyzing data, in accordance with the principles of the present disclosure. The screenshot depicts reports generated using a user-defined hierarchy. That is, a user provided a sequence definition for one or more tables of attributes used to generate the reports. In this example, the user defined two different sequence definitions for the hierarchy of the profit center attribute. Such a flexible hierarchy can enable the user to generate a number of different hierarchies with focus on different attributes. For example, the user in this example may have defined sequence definitions to generate a channel analysis report 702 and a channel and product analysis report 704. The user may have defined sequences of attributes to obtain hierarchies that focus on geographic location 706*a* and line of business 708*a*/710*a* attribute metrics with distribution channel and amount in CC currency attribute values in report 702. Similarly, the user may have defined sequences of attributes to obtain hierarchies that focus on geographic location 706*b* and line of business 708*b*/710*b* attribute metrics in combination with distribution channel, material used and the amount in CC currency attribute values in report 704.

As shown by report 702 at item 712, region 010 (e.g., Shanghai) in China, appears to have the highest sales for Super Market. Using the flexible hierarchy to generate reports similar to reports 702 and 704, a user can analyze which channel may sell higher than another channel, which products may sell faster, and which market of customers may purchase particular products. For example, in report 704, Superb sells the highest amount in the Super Market distribution channel shown at item 714, but Mobil Silver sells the highest amount of the direct sales, as shown by item 716.

In some implementations, the user may also generate mixed hierarchy sequence definitions that take into account a number of attributes. In general, the sequence definitions can be used to link hierarchy with transactional data to provide in depth analysis for customers, products, channel insight, etc.

FIG. 8 is an example screenshot depicting a flexible organizational hierarchy for use in analyzing data, in accordance with the principles of the present disclosure. The screenshot depicts a report 800 generated using a user-defined hierarchy. That is, a user provided a sequence definition for one or more tables of attributes used to generate report 800. Here, the report 800 was generated for analyzing the distribution channel based on a customer. The flexible hierarchy definition may have been configured to select the profit center attribute with the geographic location selected at the highest level 802 of the hierarchy, the region of the country as the second highest level 804 of the hierarchy, and the profit center area as the third level 806 of the hierarchy. The user may have selected to see distribution channel, customer, and amount in CC currency as attributes in which to analyze. Using report 800, the user can see that one customer (MO5037 contributed the highest amount of funds, as shown by item 808.

Figure 9:
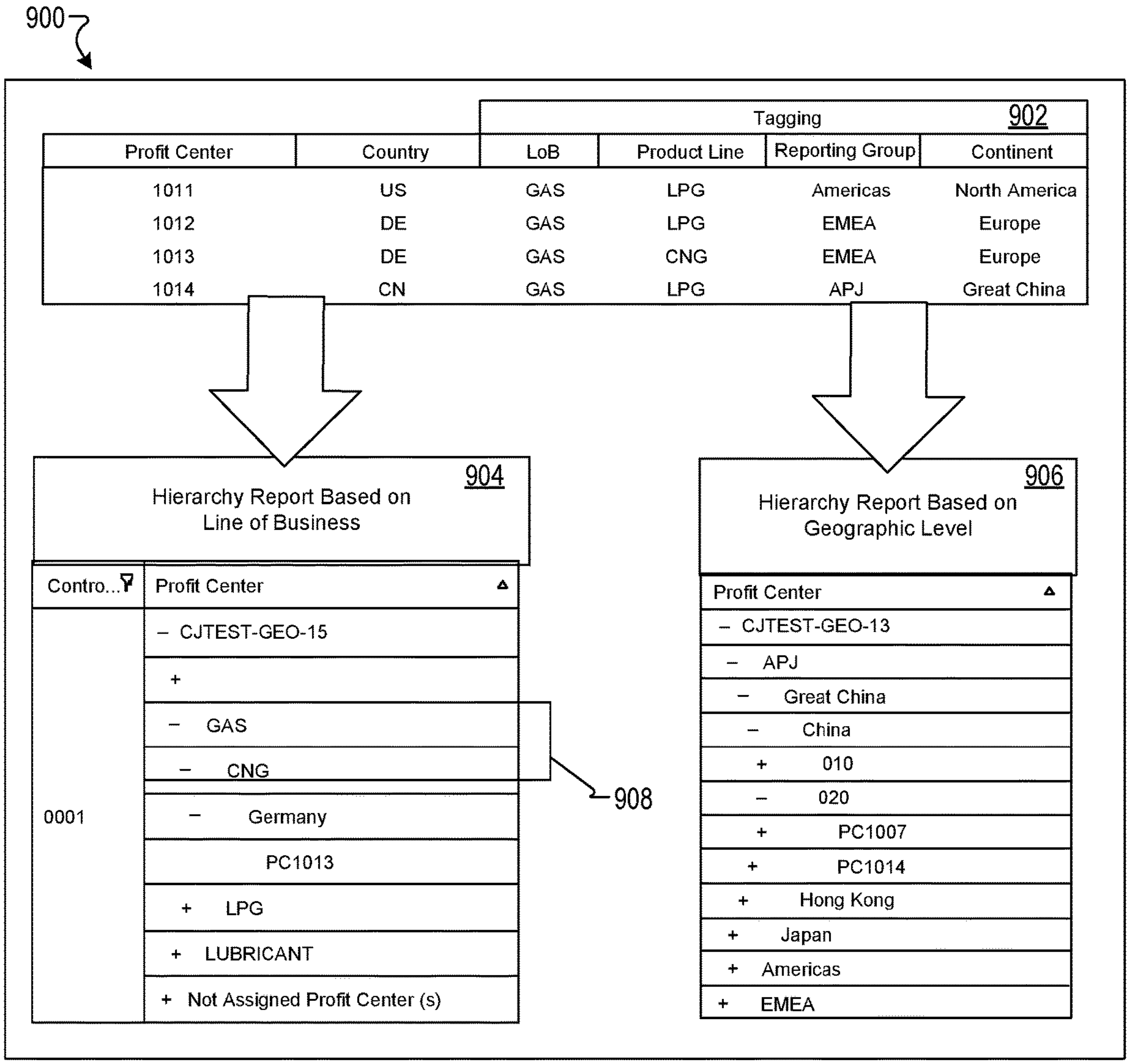
FIG. 9 is an example screenshot depicting an example of utilizing a flexible organizational hierarchy, in accordance with the principles of the present disclosure.

FIG. 9 is an example screenshot 900 depicting an example of utilizing a flexible organizational hierarchy, in accordance with the principles of the present disclosure. The screenshot depicts an attribute table 902 and two reports 904, 906 generated using a user-defined hierarchy. That is, a user provided a sequence definition for one or more tables of attributes (e.g., table 902) used to generate the two reports. The sequence definition to define the hierarchy of attributes included levels in order from first hierarchy level to last hierarchy level: a geographical area, a region, a line of business, and a product line. The GAS line of business may have been a new line of business 908 recently added to the company. A user can access the systems and methods described herein to generate a new hierarchy based on the new line of business.

The user can use a hierarchy with the line of business as the top level to generate reports based on the line of business, as shown in report 904. Similarly, the user can use a hierarchy with the geographic level as the top level to generate reports based on the line of business, as shown in report 906.

In some implementations, sequence definitions to dictate hierarchies for master data can be applied using tags. For example, any number of tags can be applied to attributes to indicate a hierarchy level. Users can implement mass changes for tags as well, by selecting a list of profit centers, for example, based on existing tags and then changing a single tag (e.g., LOB or Segment). Enabling building of a hierarchy based on assigned tags provides a fast and efficient way to define a new hierarchy. For example, instead of assigning each and every profit center to a new hierarchy, an ordering of tags can instead be defined (e.g., as sequence of attributes. The tagging activity may also provide an efficient way to set up different hierarchies in parallel, simply by using a different sequence of attributes. For example, a company may sometimes begin reporting with the Segment, and sometimes may begin reporting with the LOB."

Figure 10:
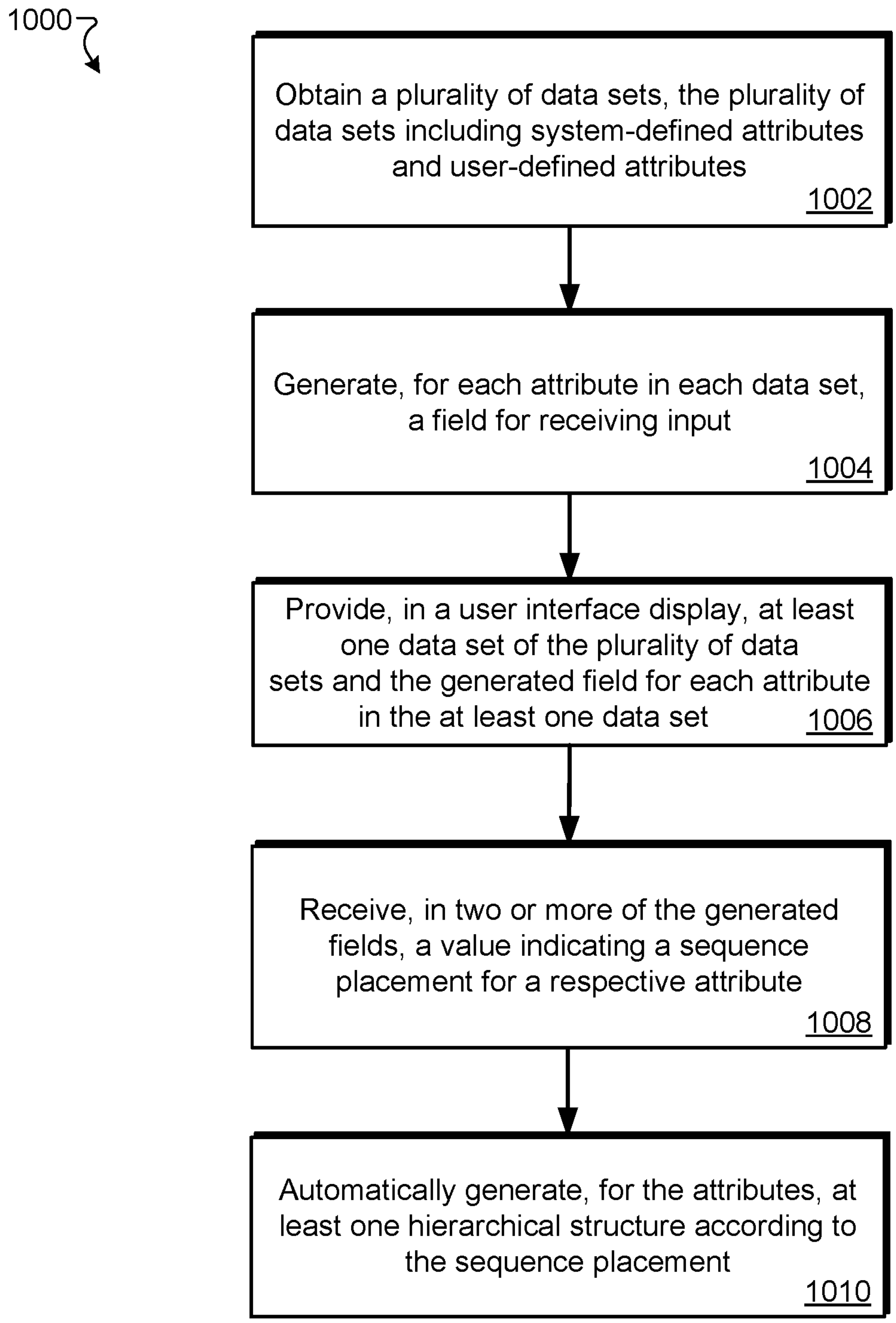
FIG. 10 is an illustration of an example process for generating a flexible organizational hierarchy, in accordance with the principles of the present disclosure.

Referring to FIG. 10, a process 1000 is depicted for a computer-implemented method for generating a flexible data hierarchy. In some ERP systems, many types of master data exist. For example, in a finance application of an ERP system, master data may include Cost Centers, Profit Centers, Company Codes, Controlling Areas, WBS Elements, etc. Each type of master data has not only the attributes delivered by the ERP system, but also the (extension) attributes defined by the users of the ERP system.

Many financial reports may be built base upon the hierarchy structure of the master data. The hierarchy structure of master data on a particular report is constructed based on attribute values of the master data, including both system-defined attributes and user-defined attributes. Updates to attribute values of the master data occur frequently. Such updates may invoke users to build different attribute-value-based hierarchies of the master data for different financial reporting purpose. The following method enables users to build a flexible and changeable data hierarchy that can be modified using a sequence definition applied to any number of attributes within master data.

At block 1002, the process 1000 may include obtaining a plurality of data sets. For example, the system 202 can obtain any number of data sets and provide such information for display to a user within a user interface. In particular, a user can access system 202 using one or more devices of device type 206*a-e* to open applications configured to display the data sets. The data sets may include master data and data corresponding to master data. The plurality of data sets may include system-defined attributes and user-defined attributes. For example, a cost center may be an attribute defined by system 202 while a product name may be an attribute defined by a user. Any number of system-defined attributes and/or user-defined attributes can be part of a data set.

At block 1004, the process 1000 includes generating, for each attribute in each data set, a field for receiving input. The field may be adapted to receive input including, but not limited to text, symbols, numbers, etc. A number of attributes may be included in each data set. Such attributes can be depicted in a list, a linked list, a database, a table, a delimited file, just to name a few examples. If the attributes are in a table form, the attributes may be listed in a number of rows of a column and the generated field may be a column generated to correspond to the column of attributes.

At block 1006, the process 1000 includes providing, in a user interface display, at least one data set of the plurality of data sets and the generated field for each attribute in the at least one data set. For example, an attribute list may be displayed near or adjacent to a column of generated fields. In another example, a row of attributes may be depicted near or adjacent to a row of fields. In general, each field corresponds to at least one attribute.

At block 1008, the process 1000 includes receiving, in two or more of the generated fields, a value indicating a sequence placement for a respective attribute associated with a respective field of the two or more generated fields. For example, a value may pertain to a number entered to indicate a level of hierarchy for the particular attribute, as shown by example in column 404 of FIG. 4.

At block 1010, the process 1000 includes automatically generating, for the attributes associated with the two or more fields having a value, at least one hierarchical structure according to the sequence placement. For example, upon having a number of values that correspond to a desired ordering of attributes, the system 202 can automatically generate a sequence definition that dictates a placement of each attribute within a sequence. The sequence may dictate a hierarchical structure for attributes and attribute values when such attributes and values are used in a display of the data. For example, the hierarchical structure may be used in a report, a point of sale listing, a manufacturing bill of materials, a sales or finance report or forecast, just to name a few examples.

Such hierarchies are flexible in that the sequence (i.e., structure of hierarchy) can be modified by changing the fields that dictate the sequence of order for the attributes or attribute values. Thus, none of the master data for the attributes or attribute values has to be modified. The sequence can be applied, modified, updated, or otherwise changed to generate new information, reports, and data usable in making business decisions.

In some implementations, the process 1000 also includes receiving a query directed to at least one attribute associated with the two or more fields having a value. For example, a user accessing system 202 on a device of device type 206*a-e* may enter a query to review information pertaining to a particular attribute. A report can be generated based on the query receipt. The sequence (i.e., ordering) of content in the report is generated based on the at least one hierarchical structure. The report includes attribute names and attribute values defined by the attributes associated with fields described above that included values indicating the hierarchical sequence of information.

In some implementations, the at least one hierarchical structure is modified and stored as a second hierarchical structure for the at least one data set, in response to receiving one or more values for additional attributes in the at least one data set. For example, a system or user can enter additional values in fields associated with other attributes in the at least one displayed data set. The additional values can be taken into account to build a different hierarchy pertaining to the originally selected attributes and any newly selected attributes (e.g., selected by entering a value in the field generated for the attribute or attribute value).

In some implementations, the method 1000 may include receiving an updated value in one or more field in the at least one data set. The updated value may trigger an automatic generation of a second hierarchical structure indicating an updated sequence placement for one or more attributes. For example, in column 404 of FIG. 4, the user may enter additional values for COMPANYCODE and SEGMENT. Such additional values may be taken into account with the attributes listed by values 1-5 to generate an updated (second) hierarchical structure that now includes seven levels instead of five. For example, the at least one hierarchical structure may be updated, in response to receiving one or more user-defined attributes and a value indicating a sequence placement for each user-defined attribute, the updated hierarchical structure may include a display order for each attribute that includes a value in the generated field.

In some implementations, the method 1000 may include providing at least one data set, in response to receiving a request to access financial data. For example, the data set may be provided in response to entering a finance application and selecting an attribute.

In some implementations, the method 1000 may include receiving a validity date range for the at least one hierarchical structure. The validity date range may define a time period in which the at least one hierarchical structure provides valid information. In addition, the method 1000 may include storing the at least one hierarchical structure with the validity date and retrieving the hierarchical structure to generate at least one report, in response to receiving a query that pertains to the attributes corresponding to the hierarchical structure and a data within the validity date range. In some implementations, the at least one report depicts, in the user interface (e.g., user interface 600 or 900), portions of the at least one data set ordered according to the hierarchical structure.

The present disclosure describes a number of graphical user interfaces of software applications that display content together with functions and other information. Such applications may include, among other things, standalone software programs with a built-in display module that generates a graphical user interface. Alternatively, display functionality may be provided separately, e.g., as an add-on package, a plug-in or through a separate program that communicates with a content providing program via an Application Program Interface (API). The content providing program and/or the display program may be executed locally on a user device and/or remotely, as a Web application, for example.

The multiple applications described herein may be hosted on the same or different types of computer platforms or systems (possibly including some applications hosted on the client device itself). In example implementations, the different types of computer platforms or systems may include, for example, SAP S/4HANA®, SAP ABAP® development tools, or other enterprise-type computer platforms or systems.

In example implementations, the suite of the multiple applications which an enterprise may deploy for its operations (e.g., in the areas or domains of Finance, R&D, Engineering, Human Resources, Manufacturing, etc.) may be large. Different subsets of these applications may be used in the work of enterprise personnel who may have a variety of different roles. Each user may have a need to use a different respective subset of the multiple applications, based, for example, on the user's role in the enterprise.

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable non-transitory storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

What is claimed is:

1. A computer-implemented method for providing a flexible data hierarchy, the method comprising:

obtaining a first plurality of attributes, the first plurality of attributes comprising system-defined attributes and user-defined attributes, the system-defined attributes and user-defined attributes corresponding to fields of one or more tables in a relational database system;

generating, for respective attributes of a second plurality of attributes of the first plurality of attributes, a field for receiving user input;

providing, in a user interface display, identifiers for the second plurality of attributes and their corresponding fields;

receiving, in a first field for a first attribute of the second plurality of attributes, a first value indicating a first sequence placement for the first attribute, the first sequence placement being a highest level in an attribute hierarchy;

receiving, in a second field for a second attribute of the second plurality of attributes, a second value indicating a second sequence placement for the second attribute, wherein the second value indicates that the second attribute is at a lower level of the attribute hierarchy than the first attribute;

automatically generating, for the second plurality of attributes, at least one hierarchical structure according to the sequence placement; and storing the at least one hierarchical structure in a manner accessible to a computer processor.

2. The method of claim 1, further comprising:

receiving a query directed to at least the first attribute and the second attribute;

determining that that the at least one hierarchical structure is associated with the query;

retrieving the at least one hierarchical structure;

retrieving a plurality of values for at least the first attribute and the second attribute to provide a plurality of attribute values;

processing the plurality of attribute values according to the at least one hierarchical structure to provide a processed plurality of attribute values; and generating at least one report based at least in part on the processed plurality of attribute values, the at least one report comprising attribute identifiers and attribute values ordered according to the attribute hierarchy.

3. The method of claim 1, further comprising:

receiving user input assigning a third value indicating a third sequence placement to a third attribute of the second plurality of attributes, wherein the third value specifies a position of the third attribute in the attribute hierarchy relative to the first attribute and the second attribute, the user input defining an updated sequence placement;

automatically generating a second hierarchical structure for the second plurality of attributes according to the updated sequence placement;

storing the second hierarchical structure in a manner accessible to a computer processor.

4. The method of claim 1, further comprising:

receiving an updated sequence value for the first attribute or the second attribute, the updated sequence value indicating that the second attribute is at a higher level of the attribute hierarchy than the first attribute; and automatically generating a second hierarchical structure indicating an updated sequence placement for the first attribute and the second attribute.

5. The method of claim 1, further comprising:

rendering an attribute hierarchy display, the attribute hierarchy display comprising a first identifier for the first attribute and an indication that the first sequence value is assigned to the first attribute and a second identifier for the second attribute and an indication that the second sequence value is assigned to the second attribute.

6. The method of claim 1, further comprising:

receiving a validity date range for the at least one hierarchical structure, the validity date range comprising a time period in which the at least one hierarchical structure provides valid information;

storing the at least one hierarchical structure with the validity date; and retrieving the hierarchical structure and generating at least one report according to the hierarchical structure, in response to receiving a query that pertains to the attributes corresponding to the hierarchical structure and that comprises a date within the validity date range.

7. The method of claim 6, wherein the at least one report depicts, in the user interface, at least one value for the first attribute and at least one value for the second attribute ordered according to the at least one hierarchical structure.

8. A system for generating a user interface, the system comprising:

a processor;

a memory coupled to the processor; and one or more computer readable media storing computer executable operations executable to perform operations to:

obtain at least one data set comprising a first plurality of attributes, each attribute comprising an attribute identifier, the plurality of attributes corresponding to fields of one or more tables in a relational database system;

generate, for each attribute of a second plurality of attributes of the first plurality of attributes, a field for receiving input;

provide, in a user interface display, identifiers for the second plurality of attributes and their respective generated fields;

receive, in a first field for a first attribute of the second plurality of attributes, a first value indicating a first sequence placement for the first attribute, the first sequence placement being a highest level in an attribute hierarchy;

receive, in a second field for a second attribute of the second plurality of attributes, a second value indicating a second sequence placement for the second attribute, wherein the second value indicates that the second attribute is at a lower level of the attribute hierarchy than the first attribute;

automatically generate, for the first attribute and the second attribute, at least one hierarchical structure according to the sequence placement; and store the at least one hierarchical structure in a manner accessible to the processor.

9. The system of claim 8, the one or more computer readable media storing computer executable operations to perform operations to:

receive a query directed to at least the first attribute and the second attribute;

determine that that the at least one hierarchical structure is associated with the query;

retrieve the at least one hierarchical structure;

retrieve a plurality of values for at least the first attribute and the second attribute to provide a plurality of attribute values;

process the plurality of attribute values according to the at least one hierarchical structure to provide a processed plurality of attribute values; and generate at least one report based at least in part on the processed plurality of attribute values, the at least one report comprising attribute identifiers and attribute values ordered according to the attribute hierarchy.

10. The system of claim 8, the one or more computer readable media storing computer executable operations to perform operations to:

receive user input assigning a third value indicating a third sequence placement to a third attribute of the second plurality of attributes, wherein the third value specifies a position of the third attribute in the attribute hierarchy relative to the first attribute and the second attribute, the user input defining an updated sequence placement;

automatically generate a second hierarchical structure for the second plurality of attributes according to the updated sequence placement;

store the second hierarchical structure in a manner accessible to a computer processor.

11. The system of claim 8, the one or more computer readable media storing computer executable operations to perform operations to:

receive an updated sequence value for the first attribute or the second attribute, the updated sequence value indicating that the second attribute is at a higher level of the attribute hierarchy than the first attribute; and automatically generate a second hierarchical structure indicating an updated sequence placement for the first attribute and the second attribute.

12. The system of claim 8, the one or more computer readable media storing computer executable operations to perform operations to:

render an attribute hierarchy display, the attribute hierarchy display comprising a first identifier for the first attribute and an indication that the first sequence value is assigned to the first attribute and a second identifier for the second attribute and an indication that the second sequence value is assigned to the second attribute.

13. The system of claim 8, the one or more computer readable media storing computer executable operations to perform operations to:

receive a validity date range for the at least one hierarchical structure, the validity date range comprising a time period in which the at least one hierarchical structure provides valid information;

store the at least one hierarchical structure with the validity date; and retrieve the hierarchical structure and generate at least one report according to the hierarchical structure, in response to receiving a query that pertains to the attributes corresponding to the hierarchical structure and that comprises a date within the validity date range.

14. A computer program product for generating a user interface, the computer program product being tangibly embodied on a non-transitory computer-readable storage medium and comprising instructions that, when executed by at least one computing device, are configured to cause the at least one computing device to:

obtain at least one data set comprising a first plurality of attributes, each attribute comprising an attribute identifier the plurality of attributes corresponding to fields of one or more tables in a relational database system;

generate, for each attribute of a second plurality of attributes of the first plurality of attributes, a field for receiving input;

provide, in a user interface display, identifiers for the plurality of attributes and their respective generated field;

receive, in two or more of the generated fields, a value indicating a sequence placement for a respective attribute associated with a respective field of the two or more generated fields; and receive, in a first field for a first attribute of the second plurality of attributes, a first value indicating a first sequence placement for the first attribute, the first sequence placement being a highest level in an attribute hierarchy;

receive, in a second field for a second attribute of the second plurality of attributes, a second value indicating a second sequence placement for the second attribute, wherein the second value indicates that the second attribute is at a lower level of the attribute hierarchy than the first attribute;

automatically generate, for the first attribute and the second attribute, at least one hierarchical structure according to the sequence placement; and store the at least one hierarchical structure in a manner accessible to a computer processor.

15. The computer program product of claim 14, wherein the instructions executed by at least one computing device are configured to cause the at least one computing device to:

receive a query directed to at least the first attribute and the second attribute;

determine that that the at least one hierarchical structure is associated with the query;

retrieve the at least one hierarchical structure;

retrieve a plurality of values for at least the first attribute and the second attribute to provide a plurality of attribute values;

process the plurality of attributes values according to the at least one hierarchical structure to provide a processed plurality of attributes values; and generate at least one report based at least in part on the processed plurality of attribute values, the at least one report comprising attribute identifiers and attribute values ordered according to the attribute hierarchy.

16. The computer program product of claim 14, wherein the instructions executed by at least one computing device are configured to cause the at least one computing device to:

receive user input assigning a third value indicating a third sequence placement to a third attribute of the second plurality of attributes, wherein the third value specifies a position of the third attribute in the attribute hierarchy relative to the first attribute and the second attribute, the user input defining an updated sequence placement;

automatically generate a second hierarchical structure for the second plurality of attributes according to the updated sequence placement;

store the second hierarchical structure in a manner accessible to a computer processor.

17. The computer program product of claim 14, wherein the instructions executed by at least one computing device are configured to cause the at least one computing device to:

receive an updated sequence value for the first attribute or the second attribute, the updated sequence value indicating that the second attribute is at a higher level of the attribute hierarchy than the first attribute; and automatically generate a second hierarchical structure indicating an updated sequence placement for the first attribute and the second attribute.

18. The computer program product of claim 14, wherein the instructions executed by at least one computing device are configured to cause the at least one computing device to:

render an attribute hierarchy display, the attribute hierarchy display comprising a first identifier for the first attribute and an indication that the first sequence value is assigned to the first attribute and a second identifier for the second attribute and an indication that the second sequence value is assigned to the second attribute.

19. The computer program product of claim 14, wherein the instructions executed by at least one computing device are configured to cause the at least one computing device to:

receive a validity date range for the at least one hierarchical structure, the validity date range comprising a time period in which the at least one hierarchical structure provides valid information;

store the at least one hierarchical structure with the validity date; and retrieve the hierarchical structure and generate at least one report according to the hierarchical structure, in response to receiving a query that pertains to the attributes corresponding to the hierarchical structure and that comprises a date within the validity date range.

20. The computer program product of claim 19, wherein the at least one report depicts, at least one value for the first attribute and at least one value for the second attribute ordered according to the at least one hierarchical structure.

* * * * *